(12) United States Patent
Berg et al.

(10) Patent No.: US 7,058,939 B2
(45) Date of Patent: Jun. 6, 2006

(54) AUTOMATIC LINK MAINTENANCE TO ENSURE REFERENTIAL INTEGRITY CONSTRAINTS

(75) Inventors: Daniel C. Berg, Apex, NC (US); Martin Nally, Raleigh, NC (US); Lawrence S. Rich, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 742 days.

(21) Appl. No.: 09/827,290

(22) Filed: Apr. 5, 2001

(65) Prior Publication Data

US 2004/0015847 A1    Jan. 22, 2004

(51) Int. Cl.
  *G06F 9/44*    (2006.01)
(52) U.S. Cl. .................. 717/165; 717/114; 717/115; 707/100; 707/103; 707/200; 707/205; 707/206
(58) Field of Classification Search ................ 717/114, 717/115, 165; 707/100, 103, 200, 205, 206
See application file for complete search history.

(56) References Cited

U.S. PATENT DOCUMENTS

| | | | | |
|---|---|---|---|---|
| 5,412,797 | A * | 5/1995 | Rubin ................... | 707/103 R |
| 5,560,014 | A | 9/1996 | Imamura ................ | 395/700 |
| 5,586,326 | A | 12/1996 | Ryu et al. .............. | 395/701 |
| 5,761,445 | A | 6/1998 | Nguyen ................. | 395/280 |
| 5,920,725 | A | 7/1999 | Ma et al. ................ | 395/712 |
| 6,003,040 | A | 12/1999 | Mital et al. ............. | 707/103 |
| 6,035,300 | A * | 3/2000 | Cason et al. ............ | 707/102 |
| 6,112,209 | A | 8/2000 | Gusack .................. | 707/101 |
| 6,898,782 | B1 * | 5/2005 | Brodsky et al. ......... | 717/104 |
| 2002/0107840 | A1 * | 8/2002 | Rishe .................... | 707/3 |
| 2003/0028540 | A1 * | 2/2003 | Lindberg et al. ........ | 707/100 |
| 2003/0135850 | A1 * | 7/2003 | Miloushev et al. ...... | 717/165 |

OTHER PUBLICATIONS

Mark Johnson, "Serialization and the JavaBeans Specification", Feb. 1998, <http://www.javaworld.com/javaworld/jw-02-1998/jw-02-beans.html> p. 1-15.*
Stephanie Cammarata, Prasadram Ramachandra, Darrell Shane, Extending a relational database with deferred referential integrity checking and intelligent joins, Jun. 1989, ACM Press.*
Theo Härder, Joachim Reinert, Access path support for referential integrity in SQL2, Aug. 1996, Springer-Verlag New York, Inc.*
Alberto Belussi, Mauro Negri, Giuseppe Pelagatti, An integrity constraints driven system for updating spatial databaes, Nov. 2000, ACM Press.*

* cited by examiner

*Primary Examiner*—Tuan Dam
*Assistant Examiner*—Chrystine Pham
(74) *Attorney, Agent, or Firm*—Marcia Doubet

(57) ABSTRACT

Methods, systems, and computer program products for programmatically enforcing referential integrity constraints defined for classes of an arbitrary modeling framework (such as the Meta Object Facility, or "MOF") when associations among class instances are modified. The present invention relieves the application programmer of the burden of writing code to maintain the links between instances, and applications are therefore considerably easier to write and to maintain, and programmatically maintains inverse links. This reduces the amount of data to be serialized, as the other link can be automatically resolved at the time the inverse link is reconstituted, and also helps in maintaining referential integrity among serialized instances (e.g. where associations are specified in one or more XML Metadata Interchange, or "XML", documents) because redundant information about the values of the same association will not have to be written across different documents or storage repositories.

11 Claims, 16 Drawing Sheets

FIG. 9A

| FIG. 9A |
| FIG. 9B |

FIG. 9

```
900
<?xml version="1.0" encoding="UTF-8"?>
<XMI xmi.version="1.1" timestamp="Mon Sept 20 16:13:08 EST 2000" xmlns:mof="schemas/MOF.xmi">
  <XMI.header>
    <XMI.model xmi.name="Company"/>
    <XMI.metamodel xmi.name="mof" xmi.version="1.0" href="schemas/MOF.xmi"/>
  </XMI.header>
  <XMI.content>
    <mof:Package xmi.id="Company" name="Company">
      <mof:Namespace.contents>
        <mof:Class xmi.id="Department" name="Department">
          <mof:Namespace.contents>
            <mof:Attribute xmi.id="Department_name" multiplicity="1..1" name="name">
              <mof:TypedElement.type>
                <mof:DataType href="schemas/mof.xmi#String"/>
              </mof:TypedElement.type>
            </mof:Attribute>
          </mof:Namespace.contents>
        </mof:Class>
        <mof:Class xmi.id="Employee" name="Employee">
          <mof:Namespace.contents>
            <mof:Attribute xmi.id="Employee_lastName" multiplicity="1..1" name="lastName">
              <mof:TypedElement.type>
                <mof:DataType href="schemas/mof.xmi#String"/>
              </mof:TypedElement.type>
            </mof:Attribute>
            <mof:Attribute xmi.id="Employee_firstName" multiplicity="1..1" name="firstName">
              <mof:TypedElement.type>
                <mof:DataType href="schemas/mof.xmi#String"/>
              </mof:TypedElement.type>
            </mof:Attribute>
```

FIG. 9B

```
<mof:Attribute xmi.id="Employee_title" multiplicity="1..1" name="title">
  <mof:TypedElement.type>
    <mof:DataType href="schemas/mof.xmi#String"/>
  </mof:TypedElement.type>
</mof:Attribute>
</mof:Namespace.contents>
</mof:Class>
<mof:Association xmi.id="DepartmentToEmployees" name="DepartmentToEmployees">
  <mof:Association.associationEnds>
    <mof:AssociationEnd xmi.id="DepartmentToEmployees_employees" multiplicity="0..*"
        name="employees" aggregation="COMPOSITE" type="Employee"/>      920
    <mof:AssociationEnd xmi.id="DepartmentToEmployees_department" multiplicity="1..1"
        name="department" aggregation="NONE" type="Department"/>        930
  </mof:Association.associationEnds>
</mof:Association>
</mof:Namespace.contents>
</mof:Package>
</XMI.content>
</XMI>
```

910 brackets the Association block.

FIG. 10

```
<?xml version="1.0" encoding="UTF-8"?>
<XMI xmi.version="1.1" timestamp="Mon Oct 20 16:16:25 EST 2000"
    xmlns:mof="schemas/MOF.xmi" xmlns:Company="schemas/company.xmi">
    <XMI.header>
    <XMI.model xmi.name="Employees"/>
    <XMI.metamodel xmi.name="mof" xmi.version="1.0" href="schemas/MOF.xmi"/>
    <XMI.metamodel xmi.name="Company" xmi.version="1.0" href="schemas/company.xmi"/>
    </XMI.header>
    <XMI.content>
    <Company:Employee xmi.id="E003" firstName="John" lastName="Smith" title="Staff"/>       ← 1010
    <Company:Employee xmi.id="E005" firstName="Jane" lastName="Doe" title="Staff"/>         ← 1020
    </XMI.content>
</XMI>
```

```
1100
<?xml version="1.0" encoding="UTF-8"?>
<XMI xmi.version="1.1" timestamp="Mon Oct 20 16:16:25 EST 2000"
  xmlns:mof="schemas/MOF.xmi" xmlns:Company="schemas/company.xmi" xmlns:Employees="employees.xmi">
<XMI.header>
<XMI.model xmi.name="Figure 7 Before"/>
<XMI.metamodel xmi.name="mof" xmi.version="1.0" href="schemas/MOF.xmi"/>
<XMI.metamodel xmi.name="Company" xmi.version="1.0" href="schemas/company.xmi"/>
</XMI.header>
<XMI.content>
<Company:Department xmi.id="Clothing" name="Clothing"/>  1110
<Company:Department xmi.id="Shoes" name="Shoes">             1120
  <Company:Department.employees>
    <Company:Employee href="employees.xmi#E003"/>  1130
  </Company:Department.employees>
</Company:Department>
</XMI.content>
</XMI>
```

```
<?xml version="1.0" encoding="UTF-8"?>
<XMI xmi.version="1.1" timestamp="Mon Oct 20 16:16:25 EST 2000"
    xmlns:mof="schemas/MOF.xmi" xmlns:Company="schemas/company.xmi"
    xmlns:Employees="employees.xmi">
  <XMI.header>
    <XMI.model xmi.name="Figure 7 After"/>
    <XMI.metamodel xmi.name="mof" xmi.version="1.0" href="schemas/MOF.xmi"/>
    <XMI.metamodel xmi.name="Company" xmi.version="1.0" href="schemas/company.xmi"/>
  </XMI.header>
  <XMI.content>
    <Company:Department xmi.id="Clothing" name="Clothing">
      <Company:Department.employees>
        <Company:Employee href="employees.xmi#E003"/>
      </Company:Department.employees>
    </Company:Department>
    <Company:Department xmi.id="Shoes" name="Shoes"/>
  </XMI.content>
</XMI>
```

1210 (braces region around Clothing Department block)
1220 (Shoes Department line)

```xml
<?xml version="1.0" encoding="UTF-8"?>
<XMI xmi.version="1.1" timestamp="Mon Oct 20 16:16:25 EST 2000"
  xmlns:mof="schemas/MOF.xmi" xmlns:Company="schemas/company.xmi" xmlns:Employees="employees.xmi">
  <XMI.header>
    <XMI.model xmi.name="Figure 8 Before"/>
    <XMI.metamodel xmi.name="mof" xmi.version="1.0" href="schemas/MOF.xmi"/>
    <XMI.metamodel xmi.name="Company" xmi.version="1.0" href="schemas/company.xmi"/>
  </XMI.header>
  <XMI.content>
    <Company:Department xmi.id="Clothing" name="Clothing">
      <Company:Department.employees>
        <Company:Employee href="employees.xmi#E003"/>   1310
      </Company:Department.employees>
    </Company:Department>
    <Company:Department xmi.id="Shoes" name="Shoes">
      <Company:Department.employees>
        <Company:Employee href="employees.xmi#E005"/>   1320
      </Company:Department.employees>
    </Company:Department>
  </XMI.content>
</XMI>
```

```
<?xml version="1.0" encoding="UTF-8"?>
<XMI xmi.version="1.1" timestamp="Mon Oct 20 16:16:25 EST 2000"
  xmlns:mof="schemas/MOF.xmi" xmlns:Company="schemas/company.xmi" xmlns:Employees=employees.xmi>
  <XMI.header>
    <XMI.model xmi.name="Figure 8 After"/>
    <XMI.metamodel xmi.name="mof" xmi.version="1.0" href="schemas/MOF.xmi"/>
    <XMI.metamodel xmi.name="Company" xmi.version="1.0" href="schemas/company.xmi"/>
  </XMI.header>
  <XMI.content>
    <Company.Department xmi.id="Clothing" name="Clothing">
      <Company:Department.employees>
        <Company:Employee href="employees.xmi#E003"/>    1410
        <Company:Employee href="employees.xmi#E005"/>    1420
      </Company:Department.employees>
    </Company:Department>
    <Company.Department xmi.id="Shoes" name="Shoes"/>    1430
  </XMI.content>
</XMI>
```

FIG. 15

1. If the end is a composite aggregation (aggregation by value), it is the primary end.
else
2. If an inverse exists and the inverse is a composite aggregation, then it is not the primary end.
else
3. If the end is a shared aggregation (aggregation by reference), it is the primary end.
else
4. If an inverse exists and the inverse is a shared aggregation, then it is not the primary end.
else
5. If the end is navigable,
    5a. If an inverse exists and the inverse is navigable,
        5a1. If the inverse is already the primary end, then this end is not the primary end.
        else
        5a2. If the end's multiplicity is many (upper bound is greater than 1), then it is the primary end.
    else
    5b. This end is the primary end.

AUTOMATIC LINK MAINTENANCE TO ENSURE REFERENTIAL INTEGRITY CONSTRAINTS

BACKGROUND OF THE INVENTION

1. Field of the Invention

The present invention relates to the field of computer programming, and more particularly to methods, systems, and computer program products for programmatically enforcing referential integrity constraints when modifying links or associations between class instances (including, but not limited to, associations which are specified in structured documents such as XML Metadata Interchange, or "XMI", documents).

2. Description of the Related Art

The Meta Object Facility ("MOF") Specification (which is hereby incorporated herein by reference) defines a simple meta-metamodel with sufficient semantics to describe meta-models in various domains. MOF is a standard of the Object Management Group. (Version 1.3 of the MOE Specification, dated Apr. 3, 2000, is available on the Internet from the Object Management Group.) The importance of having a meta-metamodel odd framework is to allow for the integration of metamodels across domains, which is necessary for integrating tools and applications across the life cycle using common semantics.

The MOF specification states that an association defines a classification over a set of links, through a relationship between Classifiers. A "link", in this statement, is an instance of an association denoting a connection between object instances of the Classifiers of the Association. The definition of an association requires two "AssociationEnds". FIG. 1A shows the Unified Modeling Language ("UML") representation of an Association, and FIG. 1B shows the UML representation of an AssociationEnd, according to the MOF Association structure. (UML is a standard of the Object Management Group, and is described in "UML Toolkit", H. Eriksson, M. Penker, published by John Wiley and Sons, 1997. Refer to this publication, or to the UML Specification, for a description of the notation used in FIGS. 1A and 1B. Version 1.3 of the UML Specification, dated Mar. 1, 2000, is available on the Internet from the Object Management Group. http://www.omg.org/technology/documents/formal/unified_modeling_language.htm.)

An association and its link are directional. For example, a link of <x1, y1> is different from <y1, x1>. While the MOF specification describes in detail the structure of the Association and its AssociationEnds, it does not specify how to perform the updating of each link and the maintaining of the other end for a given AssociationEnd instance. Without any specifics on these topics, the specification is missing important information that is required to maintain referential integrity among instances of Classifiers. Referential integrity is an extremely important concept within an application because it ensures that the links between Class instances point to the correct Class instances. For example, if a Department class has a link to an Employee class such that a department could have multiple employees, then adding an employee to a department while maintaining referential integrity would ensure that the link to the department instance from the employee instance pointed to the correct department to which the employee was just added. However, this referential integrity support is not defined in the MOF Specification, nor do the inventors know of any other modeling framework that provides this referential integrity support. (Note that the present invention is not limited to use with metamodels described using MOF. MOF is discussed herein merely as a representative example of a modeling framework which enables specifying links or associations between instances of classes.)

FIG. 2 illustrates the association between Department and Employee classes using UML notation. An Association 215 exists between instances of Department class 205 and Employee class 225. From an instance of Department class 205, the department's employees (which are instances of Employee class 225) can be located by navigating the association 215. This navigation is indicated by the arrowhead 235, and will return zero or more employees, as indicated by the multiplicity of this end of the association (as shown at 220). Or, from an instance of Employee class 225, the employee's department (which is an instance of Department class 205) can be located by navigating the association 215 in the inverse direction. This navigation is indicated by the arrowhead 230, and will return one and only one department, as indicated by the multiplicity of this end of the association (as shown at 210).

A structured notation known as the XML Metadata Interchange, or "XMI", has been defined as a way to exchange metadata information, such as descriptions of data models. XMI is an extension of the Extensible Markup Language, or "XML", which is a standard from the World Wide Web Consortium ("W3C") (See "Extensible Markup Language (XML) 1.0", W3C Recommendation Feb. 1998, 2nd edition 6 Oct. 2000, which is available on the Internet from the W3C, for more information on XML. XMI is a standard of the Object Management Group. Version 1.1 of the XMI Specification, dated Nov. 11, 2000, is available on the Internet at the Web page of the Object Management Group.) FIG. 9 provides an XMI document containing a metadata specification of the Department and Employee class and link information represented in FIG. 2. Note that this XMI document specifies both the "employees" association end (shown at 220 in FIG. 2), which has a multiplicity of zero to many, and the "department" end (shown at 210 in FIG. 2), which has a multiplicity of one to one. (See elements 920 and 930, respectively.)

When adding an employee to a department without a referential integrity implementation, the employee instance would not be pointing to the department instance in which it was contained. Currently, the only way to solve this problem would be to place logic in the application to maintain the links between Classifier instances. Writing this type of complex link maintenance logic is time-consuming and error-prone. However, both ends of each association must be maintained in order to ensure that the resulting data model is accurate. With reference to the department and employees example, this means (for example) that each time an employee's department link is modified, the application programmer must also provide logic for locating and modifying the department's link to this employee. While the department and employees example is a relatively simple data model, many data models have many associations among classes, and thus manually coding the logic to maintain the links can greatly increase the complexity of the application program and easily leads to unmaintainable code. As a result, a MOF application (or an application using another analogous modeling framework) could have invalid pointers between instances of its Classifiers.

Accordingly, what is needed is a technique for programmatically enforcing referential integrity constraints when modifying links or associations between class instances.

SUMMARY OF THE INVENTION

An object of the present invention is to provide a technique for programmatically enforcing referential integrity constraints when modifying links or associations between class instances.

A further object of the present invention is to provide this technique such that the application programs operating upon the class instances do not need code to explicitly maintain the links.

Still another object of the present invention is to provide a technique for programmatically maintaining referential integrity such that application programmers do not need to write code to maintain links among class instances.

Another object of the present invention is to provide a technique which ensures that the referential integrity constraints for links between class instances will be maintained.

Yet another object of the present invention is to provide a technique which enables reducing the amount of data required to serialize associations to persistent storage.

Another object of the present invention is to provide a technique for use with associations among class instances which avoids the need to write redundant information regarding a particular association across multiple documents or repositories.

A further object of the present invention is to provide a technique for programmatically managing associations which are specified in one or more XMI documents.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for programmatically enforcing referential integrity constraints among associations between class instances. The technique preferably comprises: evaluating a request to set an association end to reflect an association from an instance of a first class to an instance of a second class; setting the requested association end; and programmatically modifying an inverse association end of the association to reflect an inverse association from the instance of the second class to the instance of the first class. The evaluation may further comprise determining whether the association end has a single multiplicity or a many multiplicity. In this case, the setting and programmatically modifying operations for a particular association end that has a single multiplicity preferably further comprise: disconnecting the inverse association end from an existing instance, if any; performing the programmatic modification after performing the disconnecting; and performing the setting after performing the disconnecting. The setting and programmatically modifying operations for a particular association end that has a many multiplicity preferably further comprise: performing the setting; disconnecting the inverse association end from an existing instance, if any, after performing the setting; and performing the programmatic modification after performing the setting.

The technique may further comprise determining whether the association end or the inverse association end is a primary end of the association, and serializing only the primary end of the association during a serialization operation. The technique may be provided as link helper objects.

The present invention will now be described with reference to the following drawings, in which like reference numbers denote the same element throughout.

BRIEF DESCRIPTION OF THE DRAWINGS

FIGS. 9 through 14 provide XMI documents which are used to illustrate operation of the present invention; and FIG. 15 presents an algorithm which may be used by an implementation of the present invention to determine which end of an association should be serialized.

DESCRIPTION OF THE PREFERRED EMBODIMENTS

Figure 3:
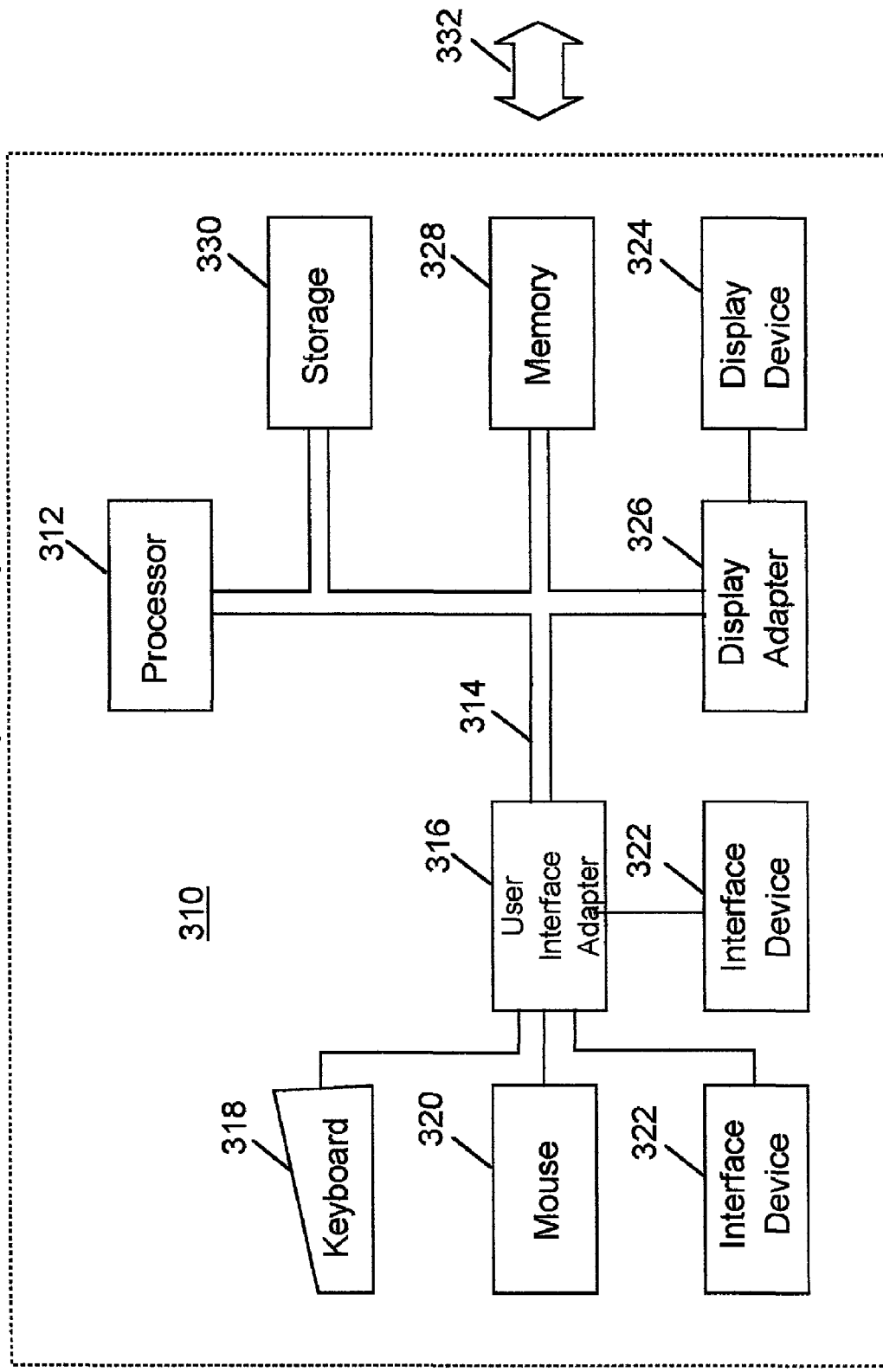
FIG. 3 is a block diagram of a computer hardware environment in which the present invention may be practiced.

FIG. 3 illustrates a representative computer hardware environment in which the present invention may be practiced. The environment of FIG. 3 comprises a representative single user computer workstation 310, such as a personal computer, including related peripheral devices. The workstation 310 includes a microprocessor 312 and a bus 314 employed to connect and enable communication between the microprocessor 312 and the components of the workstation 310 in accordance with known techniques. The workstation 310 typically includes a user interface adapter 316, which connects the microprocessor 312 via the bus 314 to one or more interface devices, such as a keyboard 318, mouse 320, and/or other interface devices 322, which can be any user interface device, such as a touch sensitive screen, digitized entry pad, etc. The bus 314 may also connect a display device 324, such as an LCD screen or monitor, to the microprocessor 312 via a display adapter 326. The bus 314 also connects the microprocessor 312 to memory 328 and long-term storage 330 which can include a hard drive, diskette drive, tape drive, etc.

The workstation 310 may communicate with other computers or networks of computers, for example via a communications channel or modem 332. Alternatively, the workstation 310 may communicate using a wireless interface at 332, such as a CDPD (cellular digital packet data) card. The workstation 310 may be associated with such other computers in a local area network ("LAN") or a wide area network ("WAN"), or the workstation 310 can be a client in a client/server arrangement with another computer, etc. All of these configurations, as well as the appropriate communications hardware and software, are known in the art.

Figure 4:
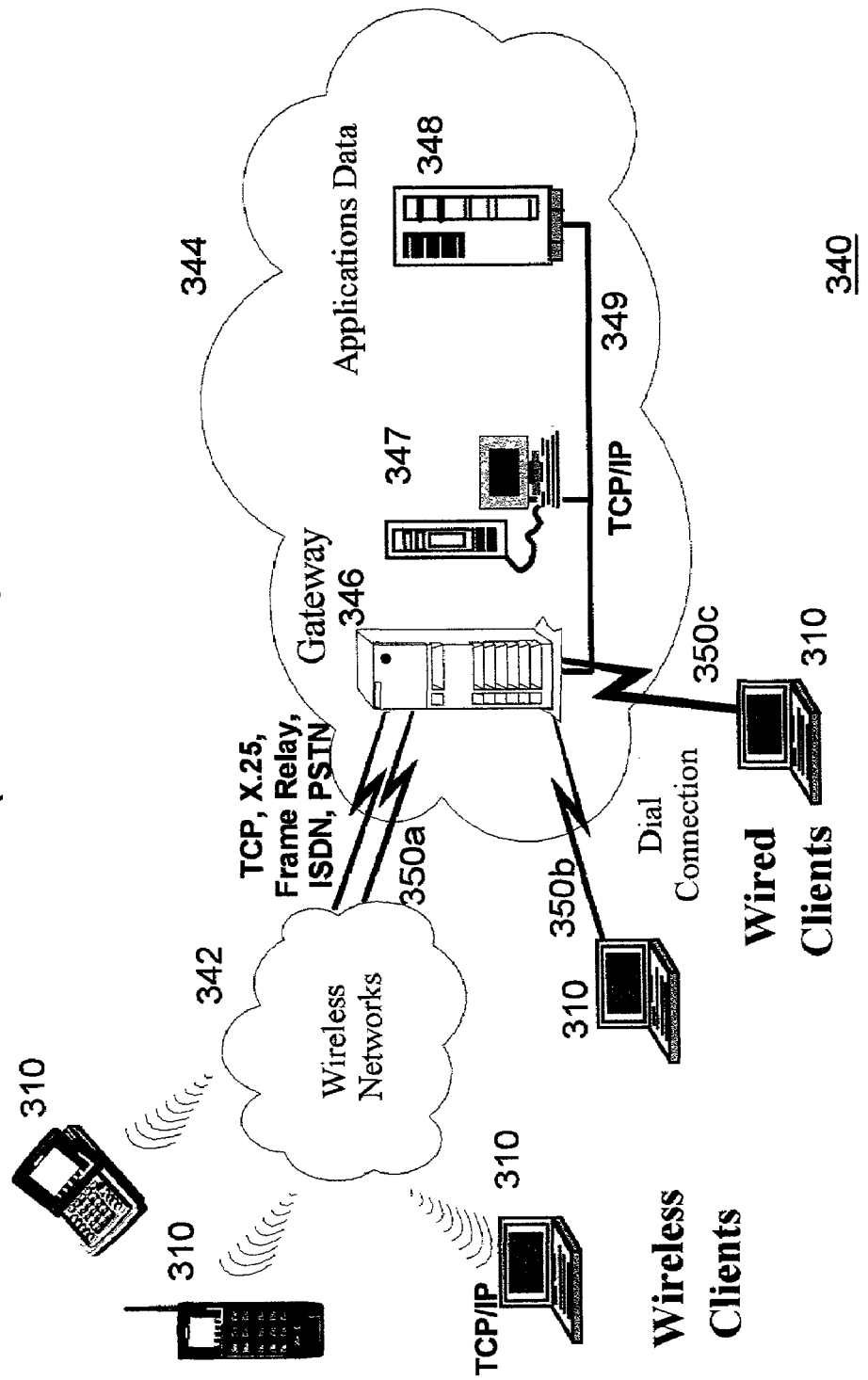
FIG. 4 is a diagram of a networked computing environment in which the present invention may be practiced.

FIG. 4 illustrates a data processing network 340 in which the present invention may be practiced. The data processing network 340 may include a plurality of individual networks, such as wireless network 342 and network 344, each of which may include a plurality of individual workstations 310. Additionally, as those skilled in the art will appreciate, one or more LANs may be included (not shown), where a LAN may comprise a plurality of intelligent workstations coupled to a host processor.

Still referring to FIG. 4, the networks 342 and 344 may also include mainframe computers or servers, such as a gateway computer 346 or application server 347 (which may access a storage device such as data repository 348). A gateway computer 346 serves as a point of entry into each network 344. The gateway 346 may be coupled to another network 342 by means of a communications link 350a. The gateway 346 may also be directly or indirectly coupled to one or more workstations 310 using a communications link such as those shown at 350b, 350c. The gateway computer 346 may be implemented utilizing an Enterprise Systems Architecture/370 available from the International Business Machines Corporation ("IBM"), an Enterprise Systems Architecture/390 computer, etc. Depending on the application, a midrange computer, such as an Application System/400 (also known as an AS/400) may be employed. ("Enterprise Systems Architecture/370" is a trademark of IBM, "Enterprise Systems Architecture/390", "Application System/400", and "AS/400" are registered trademarks of IBM.)

Those skilled in the art will appreciate that the gateway computer 346 may be located a great geographic distance from the network 342, and similarly, the workstations 310 may be located a substantial distance from the networks 342 and 344. For example, the network 342 may be located in California, while the gateway 346 may be located in Texas, and one or more of the workstations 310 may be located in New York. The workstations 310 may connect to the wireless network 342 using a networking protocol such as the Transmission Control Protocol/Internet Protocol ("TCP/IP") over a number of alternative connection media, such as cellular phone, radio frequency networks, satellite networks, etc. The wireless network 342 preferably connects to the gateway 346 using a network connection 350a such as TCP or UDP (User Datagram Protocol) over IP, X.25, Frame Relay, ISDN (Integrated Services Digital Network), PSTN (Public Switched Telephone Network), etc. The workstations 310 may alternatively connect directly to the gateway 346 using dial connections 350b or 350c. Further, the wireless network 342 and network 344 may connect to one or more other networks (not shown), in an analogous manner to that depicted in FIG. 4.

In preferred embodiments, the present invention is implemented as computer software (although embodiments in a combination of software and firmware are also possible). Software programming code which embodies the present invention is typically accessed by the microprocessor 312 of the workstation 310 or server 347 from one or more long-term storage media 330 of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 328, and accessed by the microprocessor 312 using the bus 314. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

The computing environment in which the present invention may be used includes an Internet environment, an intranet environment, an extranet environment, or any other type of networking environment. These environments may be structured using a client-server architecture, or a multi-tiered architecture. The present invention may also be used in a disconnected (i.e. stand-alone) mode, where modification of associations is performed on a workstation, server, or other computing device without communicating across a computing network.

Preferably, the software implementing the present invention will be provided as part of a toolkit or library, from which it may be inherited by classes or similarly invoked by application programs. The present invention will now be discussed in more detail with reference to FIGS. 5 through 15.

The present invention defines a technique for programmatically enforcing referential integrity constraints defined for classes of an arbitrary modeling framework, of which MOF is one example, when associations among class instances are modified. The technique defined by the present invention solves the problem of maintaining referential integrity between instances of Classifiers within the MOF specification, and may also be used with objects defined according to other modeling frameworks. The present invention provides a number of significant advantages over the prior art. First, the application programmer no longer has the burden of writing code to maintain the links between Classifier instances, and applications are therefore considerably easier to write and to maintain. In addition, by providing a programmatic enforcement technique, the referential integrity constraints of the underlying data model are guaranteed to be properly maintained.

Other advantages are found during the serialization of links to persistent storage, using optional enhancements of the preferred embodiments. Since the present invention will always maintain the inverse, if there is one, of a link, only one link from each Association needs to be serialized. (Links which are uni-directional, and can therefore only be navigated in one direction, do not have an inverse. Such links do not involve referential integrity constraints, and are therefore not pertinent to the present invention, which is concerned with bi-directional links.) The other (inverse) link can be automatically resolved at the time that the inverse link is reconstituted (using techniques for reconstituting, or reconstructing, which are known in the art). This will help to minimize the amount of data that needs to be serialized. It will also help in maintaining referential integrity among serialized Classifier instances, because redundant information about the values of the same association will not have to be written across different documents or storage repositories. For example, without the automatic link maintenance techniques of the present invention, the link specification values would have to be present in each document in which an association was specified, thereby increasing the possibility that modifying the values in each of the affected documents might be inadvertently overlooked during a particular operation, thereby leading to referential integrity constraint violations. (Note also that these benefits may be realized for associations which do not span multiple documents. For example, a single document may contain associations among multiple classes. The techniques of the present invention ensure that both ends of each association remain properly synchronized when a modification occurs.)

The following is an example of parsing an XMI document that only has one AssociationEnd serialized across two documents. FIG. 10 depicts an XMI document that contains definitions for Employee instances. This could be a list of all the employees for a particular company. FIG. 11 depicts an XMI document that contains definitions for Department instances. Since 920 of FIG. 9B indicates that the meta-data for the DepartmentToEmployees_employees AssociationEnd has an aggregation of "Composite", then it is the primary end. This is the reason that the Department instances in FIG. 11 have references to Employee instances in FIG. 10. When the XMI document in FIG. 11 is parsed, an instance of Department will be created with an ID of "Shoes". Parsing the href proxy to the E003 Employee (see 1130 of FIG. 11) from the XMI document in FIG. 10 causes an Employee instance to be created. Once this Employee instance is added to the DepartmentToEmployees_employees AssociationEnd for the Department, the present invention will automatically synchronize the ends of the DepartmentToEmployees Association in FIG. 9B by setting the DepartmentToEmployees_department AsscociationEnd value on the Employee instance with an ID of E003 to the Department instance with an ID of Shoes.

Without the teachings of the present invention in use, there would be a significant maintenance problem with the serialized links and with the code within the application to maintain the inverse AssociationEnds.

Figure 5:
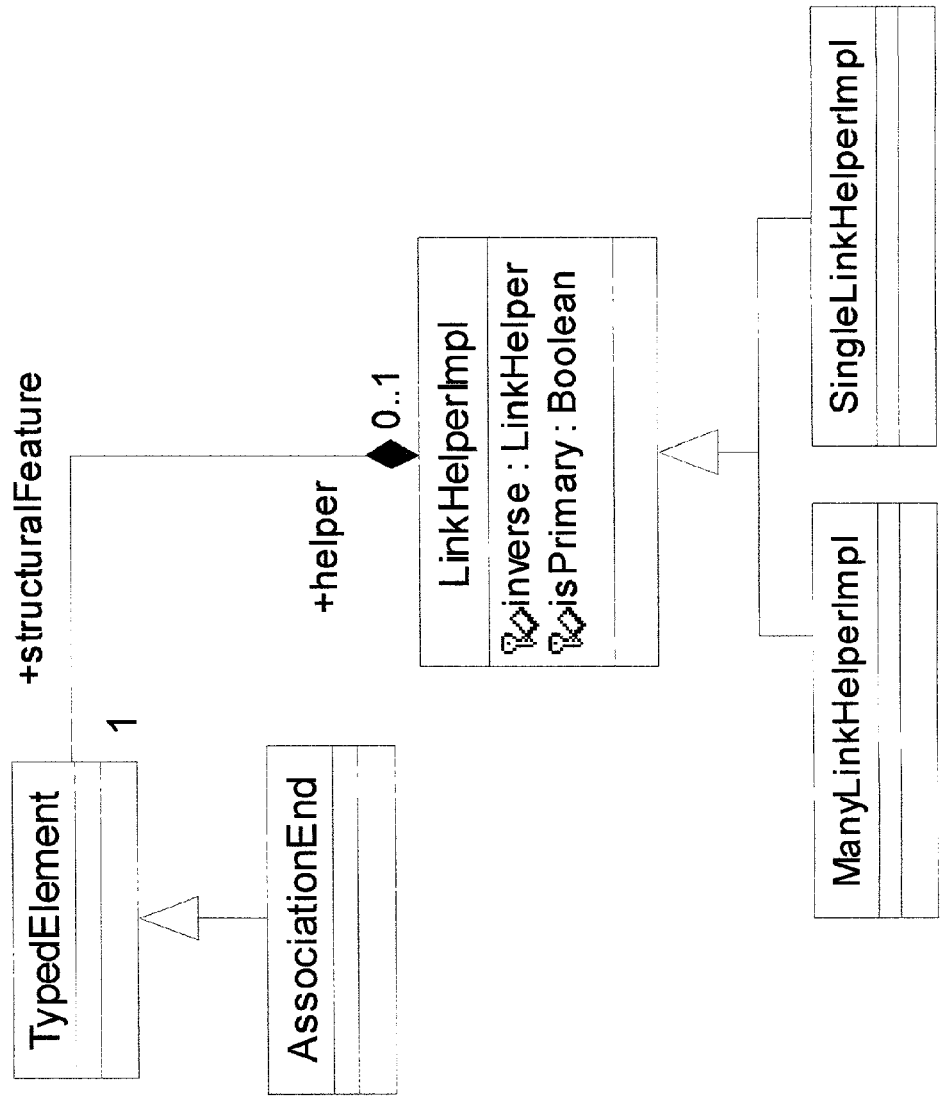
FIG. 5 provides a UML representation illustrating the LinkHelpers of the present invention.

The present invention accomplishes the task of ensuring referential integrity constraints by programmatically maintaining inverse AssociationEnds. Objects which are referred to herein as "LinkHelperImpl" objects, or "link helpers", are used for this purpose. FIG. 5 shows a UML representation of both the AssociationEnd class and the LinkHelperImpl class hierarchy, as well as how they are related. In preferred embodiments, a LinkHelperImpl has two attributes: "inverse" which will return the LinkHelperImpl for the inverse AssociationEnd, and "isPrimary" which is a Boolean used to indicate which AssociationEnd will be serialized. (In preferred embodiments, only the primary AssociationEnd is serialized; the other AssociationEnd can then be reconstituted automatically from the serialized information of the primary end.) Preferably, each AssociationEnd will have one and only one LinkHelperImpl, which can be either a "SingleLinkHelperImpl" or a "ManyLinkHelperImpl" (based upon whether the multiplicity for the AssociationEnd is one or many, respectively).

According to preferred embodiments of the present invention, manipulation of the value for an instance of an AssociationEnd is dispatched to the AssociationEnd's link helper. (In alternative embodiments, this processing might be implemented in the association end itself, rather than in a helper class. However, placing the code in the helper enables the association end to remain simply as metadata.) The link helper has several responsibilities that it must uphold in order to maintain referential integrity when the value for an instance of its AssociationEnd is changed, as follows:

1. Disconnect the current value from its inverse, if an inverse exists and is navigable.
2. Set or add the new value with the inverse type instance, depending on whether the inverse AssociationEnd has a multiplicity of one or many.
3. Set the new value with the instance of the AssociationEnd's type.

Figure 6:
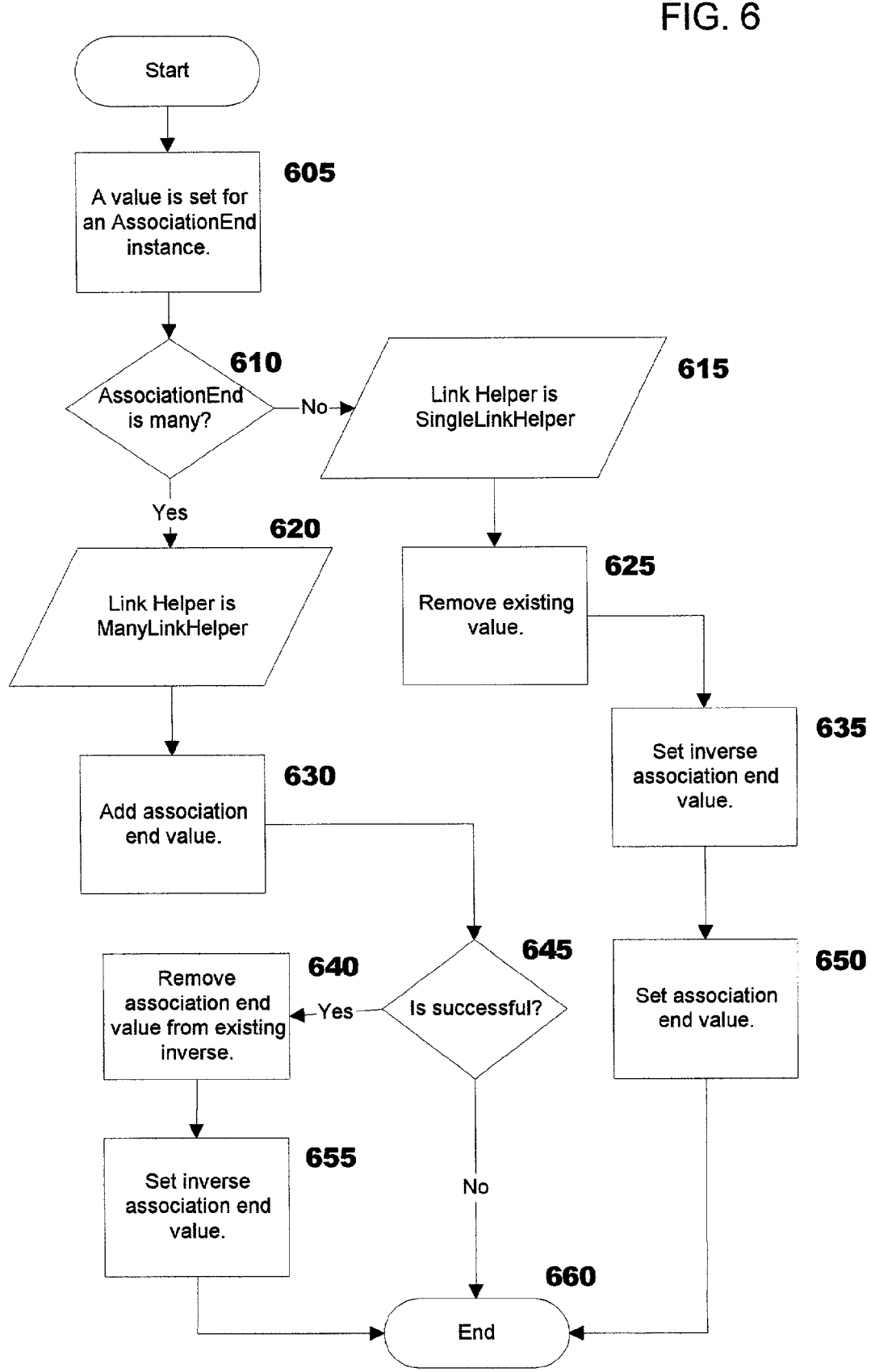
FIGS. 6 through 8 provide flowcharts illustrating logic with which preferred embodiments of the present invention may be implemented.

There are several subtle differences among a SingleLinkHelperImpl and a ManyLinkHelperImpl. A ManyLinkHelperImpl will add the new value to its AssociationEnd type instance before disconnecting from the current value or setting the inverse value. A SingleLinkHelperImpl disconnects the current inverse value first, and then sets the new value with the inverse before actually setting the new value to its AssociationEnd type instance. FIG. 6 shows the basic logic flow when an instance of an AssociationEnd is updated, and illustrates these subtle differences between the ManyLinkHelperImpl and the SingleLinkHelperImpl.

As shown in FIG. 6, when setting a value for an instance of an AssociationEnd (Block 605), a determination must be made as to whether the association end's multiplicity is many or single (Block 610). If it is many, then the path beginning at Block 620 is followed; otherwise, the path beginning at Block 615 is followed.

The many path at Block 620 begins by adding the association end's value (Block 630), after which Block 645 tests to see if the addition was successful. If not, then the processing of FIG. 6 ends by exiting at Block 660, with the inverse association end unchanged. When the addition was successful, on the other hand, Block 640 disconnects or removes the association end value from its existing inverse, and Block 655 then sets the inverse association end value.

The single path at Block 615 begins by removing the association end's existing value (Block 625). Block 635 then sets the inverse association end value, after which Block 650 sets the association end value. The processing of FIG. 6 then ends by exiting at Block 660.

Figure 1:
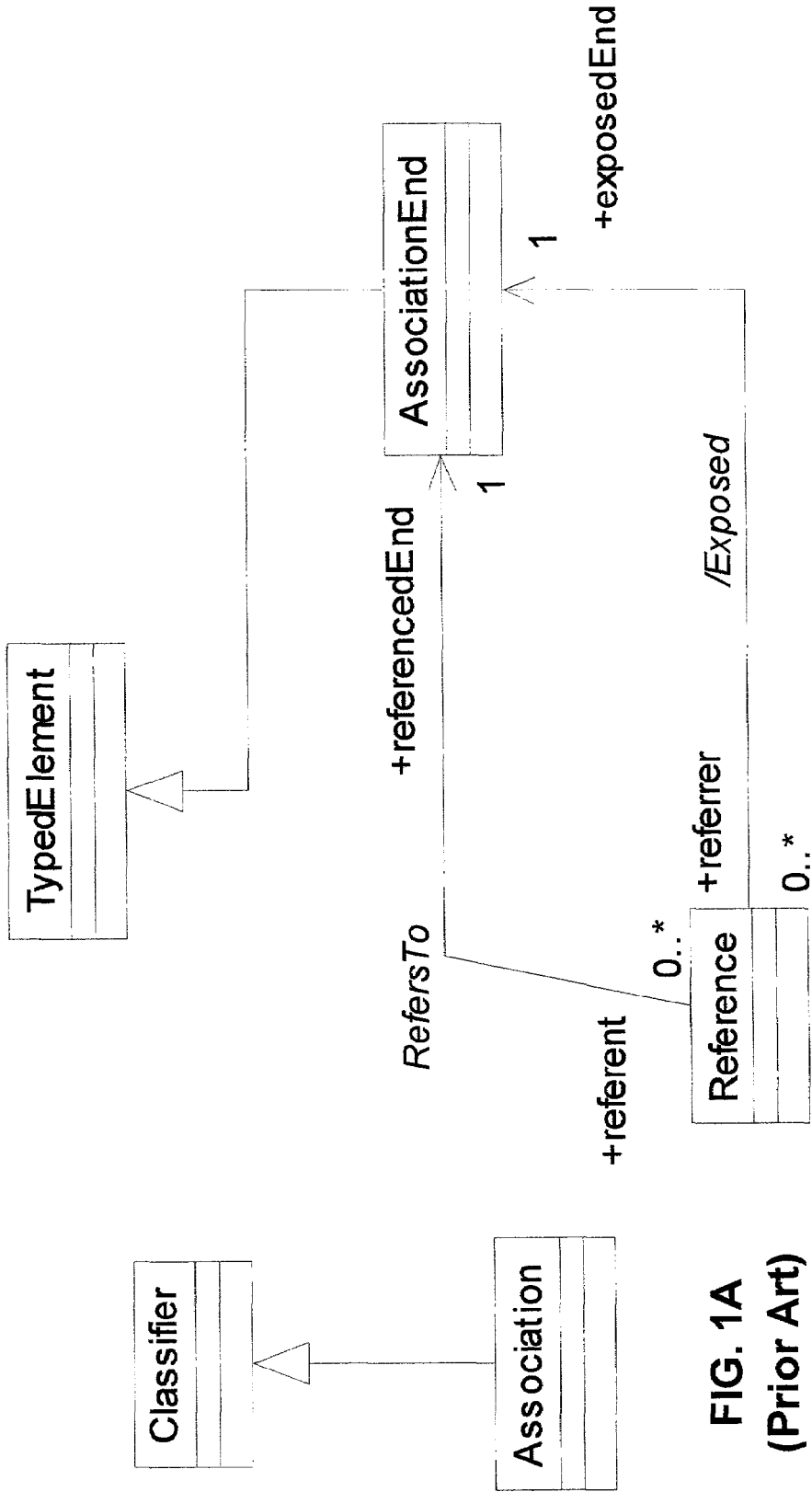
FIGS. 1A and 1B are UML representations of an Association and of an AssociationEnd, respectively, according to the MOF Association structure.
Figure 2:
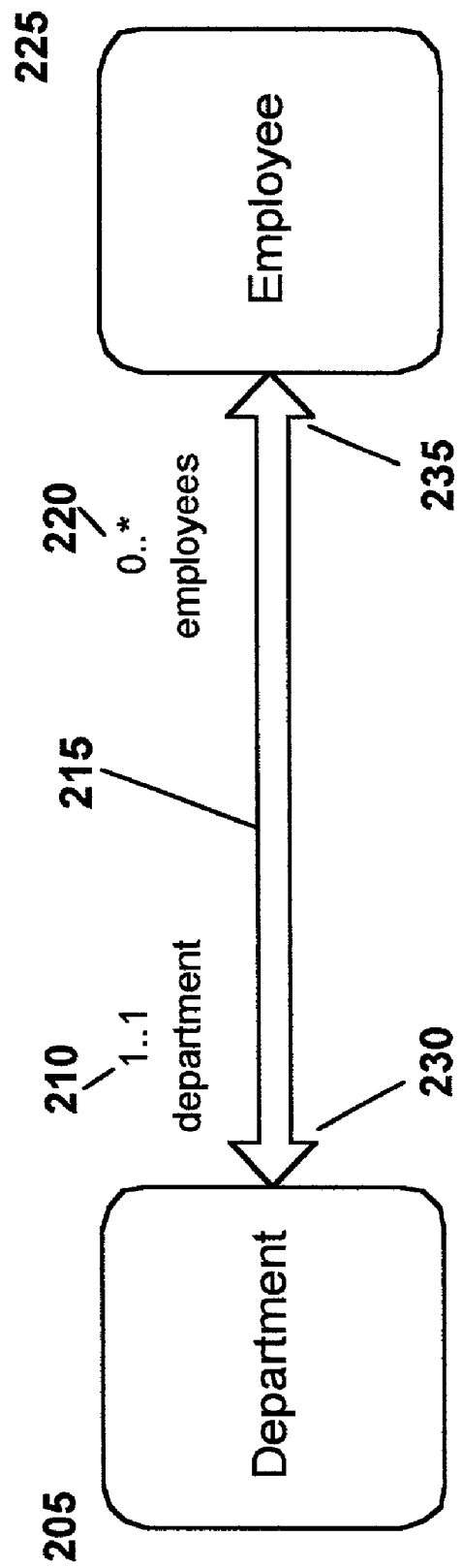
FIG. 2 is a UML representation of an example association between departments and employees.

This automatic maintenance of inverse association end values is in contrast to techniques of the prior art, in which each end of the association must be separately modified. A simple example will be used to illustrate how this process of maintaining inverse values using the LinkHelper implementation of the present invention operates. FIG. 2 showed a simple association between a Department class and an Employee class that is a navigable inverse. The XMI document 900 in FIG. 9 shows the description of each AssociationEnd corresponding to the UML representation in FIG. 2. (In particular, see the zero-to-many employees end definition 920 and the one-to-one department end definition 930 within the association ends element 910.) For this example, suppose an instance of Department is named "Clothing" and an instance of Employee is named "John Smith", and suppose that this employee's department is to be set to Clothing. This is an example of a singe association end, corresponding to navigating the association 215 in FIG. 2 in the direction of arrowhead 230. As the department for employee John Smith is set to the Clothing department the present invention will automatically remove John Smith from the list of employees for his current department (if he already has a link as an employee of some other department). and will then add him to the list of employees held by the Clothing department, thereby maintaining the inverse (employee) association end. This automatic link maintenance enforces the referential integrity constraints for the data model while ensuring that an association and its inverse are properly synchronized.

Figure 7:
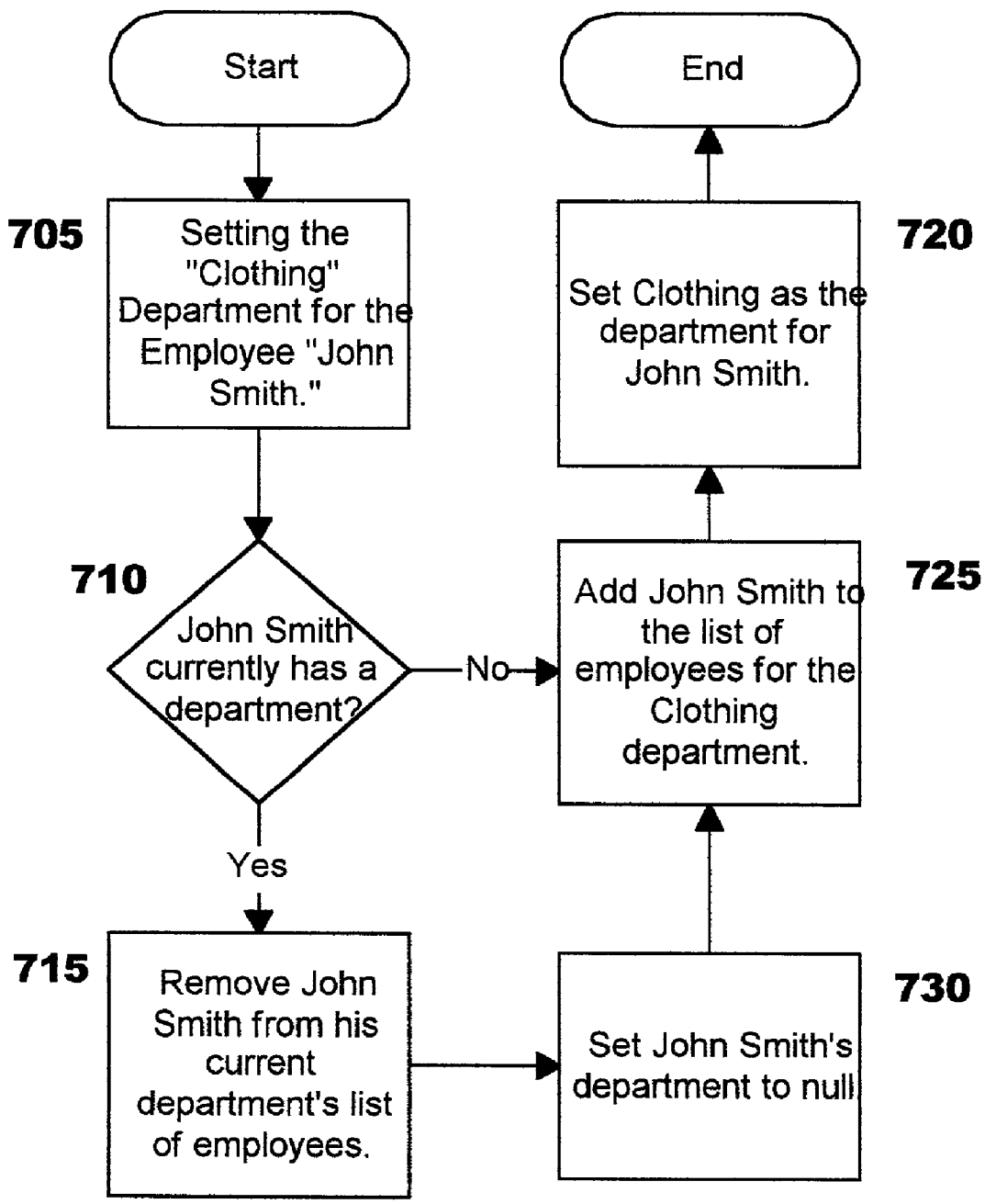

Suppose that employee John Smith has an employee number of "E003", as shown at 1010 in the XMI document 1000 of FIG. 10, which presents employee information for the data model of the example. As shown at 1110 and 1120 of FIG. 11, suppose the Clothing department initially has no employees while the Shoes department includes employee E003 (John Smith) in its employee list. In the example, the department link for employee John Smith is to be set to Clothing, rather than Shoes. This is a "single" relationship (i.e. an employee has only one department), and thus this operation corresponds to following the logic path beginning at Block 615 of FIG. 6. FIG. 7 provides a visual representation of logic used by the SingleLinkHelperImpl to set a single association end, with annotations to illustrate this particular example. FIGS. 11 and 12 depict sample XMI documents representing the effect of this operation. At Block 705, the operation of setting the employee's department begins. Block 710 checks the inverse association end to see if the employee is already linked to a department. If so, which is the case in the example (see 1120 of FIG. 11), then that link is disconnected in Block 715, thereby removing the employee from the department's list of employees. (Note that this is not a referential integrity constraint violation, because the department's employees association is zero to many.) In the example, this corresponds to removing the XMI syntax which defines employee E003 as having an employee link from the Shoes department, with the result as shown at 1220 of FIG. 12.

The employee's department link is then temporarily set to null (Block 730). In Block 725, the inverse association end is set by adding the employee to the new department's list of employees. Thus, XMI syntax is added to the XMI document 1200 to define employee E003 as having an employee link from the Clothing department, as shown at 1210 of FIG. 12. Next, the association end is modified by setting the employee's department link to the new Clothing value (Block 720), thereby completing the process (as represented by the resulting XMI document 1200 in this example).

Note that while the employee temporarily has no associated department as the processing of FIG. 7 progresses, in violation of the one-to-one referential integrity constraint, the operations of Blocks 730, 725, and 720 are preferably performed in an atomic manner, thus ensuring that no violations remain once the processing is complete. This treatment of operations as atomic is well known in the art.

Block 715 of FIG. 7 corresponds to Block 625 of FIG. 6, whereby in order to set John Smith's department to Clothing, his department (inverse) association end is first removed (such that the Shoes department no longer includes John Smith). Block 725 of FIG. 7 corresponds to Block 635 of FIG. 6, whereby the inverse association end—i.e. the employee association from the Clothing department—is automatically and programmatically set by the present invention, ensuring that this employee association is the proper inverse of the department association which is being established by the SingleLinkHelperImpl. The Clothing department therefore includes John Smith at this point. Finally, Block 720 of FIG. 7 corresponds to Block 650 of FIG. 6, where the department association end is set to the desired value, giving John Smith a department association to the Clothing department.

Figure 8:
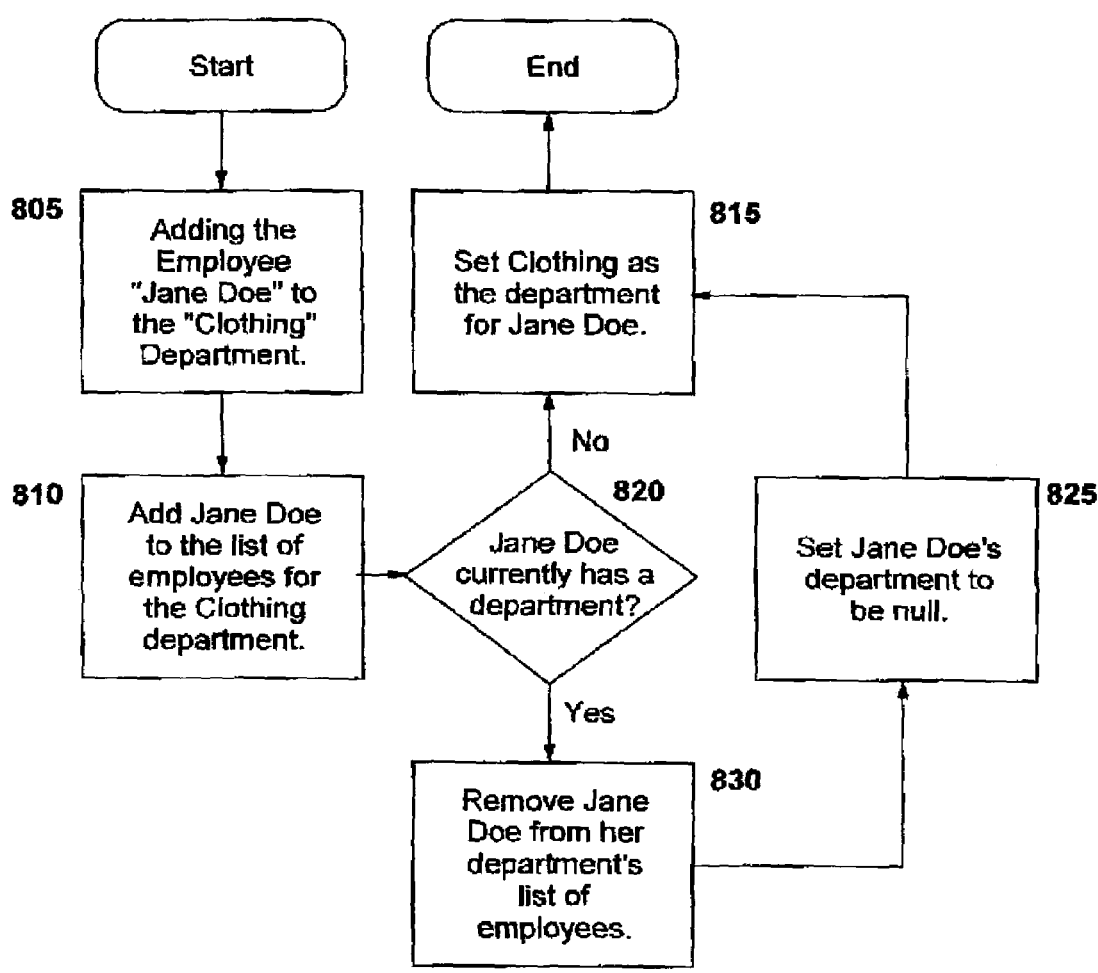

Continuing with the example to illustrate how the present invention operates, suppose an employee named "Jane Doe" is to be added to the list of employees held by the Clothing department. This is a many relationship (i.e. a department may have many employees), and thus the logic path beginning at Block 620 of FIG. 6 is followed. FIG. 8 provides a visual representation of logic used by the ManyLinkHelperImpl to set a many association end, and has annotations to illustrate this particular example. FIGS. 13 and 14 depict sample XMI documents representing the effect of this operation. In the "before" XMI document 1300, Jane Doe (who is employee "E005", as indicated at 1020 of FIG. 10) is shown at 1320 as being in the list of the employees of the Shoes department, while only employee E003 is in the list of employees of the Clothing department (see 1310). At Block 805, the operation of adding Jane Doe to the list of the Clothing department's employee associations begins. Block 810 adds the employee to the employee list. At this point, Jane Doe appears as an employee of both the Clothing and Shoes departments. Block 820 then checks to see if the employee is already linked to a department. If so, which is the case in the example (see 1320 in FIG. 13), then that link is disconnected in Block 830, thereby removing the employee from the department's list of employees. In the example, this corresponds to removing the XMI syntax 1320 which defines employee E005 as having an employee link from the Shoes department, leaving her as an employee of the Clothing department. (From the perspective of the employees association end, no referential integrity constraints are violated by the process of adding Jane Doe to the Clothing department while she is linked to the Shoes department, nor when removing her from the Shoes department's employee list.)

Next, the employee's department (inverse) association is set to null in Block 825, and this inverse association end for Jane Doe will then be set to point to the new department (i.e. Clothing) in Block 815, thereby completing the process. Thus, the resulting XMI document 1400 in FIG. 14 for this example shows that the Clothing department now has links to two employees (see 1410 and 1420), while the Shoes department has no links to employees (see 1430).

While the employee temporarily has no associated department as the processing of FIG. 8 progresses, in violation of the one-to-one referential integrity constraint, the operations of Blocks 825 and 815 are preferably performed in an atomic manner, thus ensuring that no violations remain once the operation is finished.

Block 810 of FIG. 8 corresponds to Block 630 of FIG. 6, whereby in order to add Jane Doe as an employee of the Clothing department, an employee association end is created for her in that department (such that the Clothing department now includes Jane Doe). Block 825 of FIG. 8 corresponds to Block 640 of FIG. 6, whereby the existing inverse—i.e. the department association end—for this employee is removed. Finally, Block 815 of FIG. 8 corresponds to Block 655 of FIG. 6, where the inverse association end is automatically and programmatically maintained by the present invention to ensure that Jane Doe has a department association, and that this department association is the proper inverse of the employee association which is being established by the ManyLinkHelperImpl.

In an optional enhancement, only the association end which has been designated as the primary end is serialized during a serialization operation. The "isPrimary" attribute of a LinkHelperImpl preferably returns a Boolean, indicating whether or not this is the primary end. For an end that is not primary, no serialization needs to be done. For the primary end, the serialization proceeds as in the prior art. Preferably, an algorithmic approach is used to determine which end is the primary end. An algorithm used by preferred embodiments to evaluate a particular association end is presented in FIG. 15. Note that the isPrimary flag is not set at the end of the algorithm if the association end is not navigable.

As has been demonstrated, the present invention provides an efficient technique for programmatically enforcing referential integrity constraints when modifying links between class instances which are specified according to an arbitrary modeling framework. The Inverse links are programmatically maintained, relieving the application programmer of a significant burden in terms of time and complexity for the code to be written (and subsequently maintained) for a particular application. The amount of data to be serialized is also reduced when the optional enhancement is implemented, and the process of maintaining referential integrity among serialized instances is improved because redundant information about the values of the same association will not have to be written across different documents or storage repositories.

While a preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and such modifications as fall within the spirit and scope of the invention.

What is claimed is:

1. A method for programmatically enforcing referential integrity constraints among associations between class instances, comprising steps of:
    programmatically determining, when evaluating a request to modify an existing association end of a bi-directional link to reflect in association from an instance of a first class to an instance of a second class, whether the association end to be modified has a single multiplicity or a many multiplicity;
    if the association end to be modified has the single multiplicity, modifying the existing association end by atomically and programmatically performing the steps of:
        first disconnecting a previously-existing inverse association end of the requested association end;
        next setting an inverse association end of the association to reflect an inverse association from the instance of the second class to the instance of the first class; and
        then setting the requested association end from the instance of the first class to the instance of the second class; and
    if the association end to be modified has the may multiplicity, modifying the existing association end by atomically ad programmatically performing the steps of:
        first adding the requested association end from the instance of the first class to the instance of the second class;
        next disconnecting the previously-existing inverse association end of the requested association end; and
        then setting an inverse association end of the association to reflect an inverse association from the instance of the second class to the instance of the first class.

2. The method according to claim 1, further comprising the step of serializing the association by performing steps of:
    determining whether the association end to be modified or the inverse association end is a primary end of the association; and
    serializing only the primary end of the association during the serialization.

3. The method according to claim 1, wherein the method is provided as a single link helper object and a multiple link helper object for each association, wherein the single link helper object performs the atomically and programmatically performed steps for the single multiplicity association end and the multiple link helper object performs the atomically and programmatically performed steps for the many multiplicity association end.

4. A computer program product for programmatically enforcing referential integrity constraints among associations between class instances, wherein the computer program product is embodied on one or more computer readable media and comprises computer-readable program code means for:
    programmatically determining, when evaluating a request to modify an existing association end of a bi-directional link to reflect an association from an instance of a first class to an instance of a second class, whether the association end to be modified has a single multiplicity or a many multiplicity;
    if the association end to be modified has the single multiplicity, modifying the existing association end by atomically and programmatically performing the steps of:
        first disconnecting a previously-existing inverse association end of the requested association end;
        next setting an inverse association end of the association to reflect an inverse association from the instance of the second class to the instance of the first class; and
        then setting the requested association end from the instance of the first class to the instance of the second class; and
    if the association end to be modified has the many multiplicity, modifying the existing association end by atomically and programmatically performing the steps of:
        first adding the requested association end from the instance of the first class to the instance of the second class;
        next disconnecting the previously-existing inverse association end of the requested association end; and
        then setting an inverse association end of the association to reflect an inverse association from the instance of the second class to the instance of the first class.

5. The computer program product according to claim 4, further comprising computer-readable program code means for serializing the association by performing steps of:
    determining whether the association end to be modified or the inverse association end is a primary end of the association; and
    computer-readable program code means for serializing only the primary end of the association during the serialization.

6. A system for programmatically enforcing referential integrity constraints among associations between class instances, comprising means for:
    programmatically determining, when evaluating a request to modify an existing association end of a bi-directional link to reflect an association from an instance of a first class to an instance of a second class, whether the association end to be modified has a single multiplicity or a many multiplicity;

if the association end to be modified has the single multiplicity, modifying the existing association end by atomically and programmatically performing the steps of:
  first disconnecting a previously-existing inverse association end of the requested association end;
  next setting an inverse association end of the association to reflect an inverse association from the instance of the second class to the instance of the first class; and
  then setting the requested association end from the instance of the first class to the instance of the second class; and if the association end to be modified has the many multiplicity, modifying the existing association end by atomically and programmatically performing the steps of:
  first adding the requested association end from the instance of the first class to the instance of the second class;
  next disconnecting the previously-existing inverse association end of the requested association end; and
  then setting an inverse association end of the association to reflect an inverse association from the instance of the second class to the instance of the first class.

7. The system according to claim 6, further comprising means for serializing the association by performing steps of:
  determining whether the association end to be modified or the inverse association end is a primary end of the association; and
  means for serializing only the primary end of the association during the serialization.

8. The method according to claim 1, wherein one or more structured markup language representations specify instances of the first class, instances of the second class, and associations between the instances of the first and second classes.

9. The method according to claim 8, wherein only one association end for each association between instances is specified in the structured markup language representations.

10. The method according to claim 9, wherein the only one association end is an association end designated as a primary end for the association.

11. The method according to claim 8, wherein a serialization of results of the request to modify the existing association end that has the single multiplicity comprises the step of:
  determining whether the association end to be modified is a primary end for the association, and if so, programmatically performing the steps of:
    removing the representation of the previously-existing inverse association end from the structured markup language representation in which it is specified; and
    adding a structured markup language representation of the new inverse association end.

* * * * *

UNITED STATES PATENT AND TRADEMARK OFFICE
CERTIFICATE OF CORRECTION

| | | |
|---|---|---|
| PATENT NO. | : 7,058,939 B2 | Page 1 of 1 |
| APPLICATION NO. | : 09/827290 | |
| DATED | : June 6, 2006 | |
| INVENTOR(S) | : Berg et al. | |

It is certified that error appears in the above-identified patent and that said Letters Patent is hereby corrected as shown below:

Column 1,
Line 17, change "("MOP")" to -- ("MOF") --;
Line 21, change "the MOE" to -- the MOF --;
Line 24, change "meta-metamodel odd framework" to -- meta-metamodel framework --;
Lines 44 - 45, change "Group. http://www.omg.org/technology/documents/formal/unified_modeling_language.htm.)" to -- Group.) --;

Column 2,
Line 23, change "or "XMT", has" to -- or "XMI", has --;

Column 11,
Line 35, change "reflect in association" to -- reflect an association --;
Line 52, change "has the may" to -- has the many --.

Signed and Sealed this

Twelfth Day of December, 2006

JON W. DUDAS
*Director of the United States Patent and Trademark Office*